(12) United States Patent
Ueda et al.

(10) Patent No.: US 8,227,091 B2
(45) Date of Patent: Jul. 24, 2012

(54) ALUMINUM ALLOY BRAZING SHEET FOR HEAT EXCHANGER

(75) Inventors: Toshiki Ueda, Moka (JP); Akihiro Tsuruno, Moka (JP); Fumihiro Koshigoe, Moka (JP); Keiichi Okazaki, Ichinomiya (JP); Takahiko Nagaya, Gihu (JP); Kenji Negura, Kariya (JP)

(73) Assignees: Kobe Steel, Ltd., Kobe-shi (JP); Denso Corporation, Kariya-shi (JP)

( * ) Notice: Subject to any disclaimer, the term of this patent is extended or adjusted under 35 U.S.C. 154(b) by 408 days.

(21) Appl. No.: 12/519,023

(22) PCT Filed: Dec. 18, 2007

(86) PCT No.: PCT/JP2007/074278
§ 371 (c)(1),
(2), (4) Date: Jun. 12, 2009

(87) PCT Pub. No.: WO2008/078598
PCT Pub. Date: Jul. 3, 2008

(65) Prior Publication Data
US 2010/0112370 A1    May 6, 2010

(30) Foreign Application Priority Data
Dec. 27, 2006  (JP) .................................. 2006-351228

(51) Int. Cl.
*B32B 15/01* (2006.01)
*B32B 9/04* (2006.01)

(52) U.S. Cl. ................ 428/654; 228/262.5; 228/262.51; 428/411.1; 428/457

(58) Field of Classification Search ............... 428/411.1, 428/457, 645; 228/262.5, 262.51
See application file for complete search history.

(56) References Cited

U.S. PATENT DOCUMENTS

| | | | | |
|---|---|---|---|---|
| 4,172,548 | A | * | 10/1979 | Nakamura .................... 228/183 |
| 7,387,844 | B2 | | 6/2008 | Ueda et al. |
| 2006/0134451 | A1 | | 6/2006 | Saisho et al. |
| 2009/0020276 | A1 | | 1/2009 | Ueda et al. |
| 2009/0078398 | A1 | | 3/2009 | Ueda et al. |
| 2009/0162686 | A1 | | 6/2009 | Matsukado et al. |
| 2009/0165901 | A1 | | 7/2009 | Koshigoe et al. |

FOREIGN PATENT DOCUMENTS

| | | |
|---|---|---|
| JP | 3 124393 | 5/1991 |
| JP | 3 124394 | 5/1991 |
| JP | 9-302434 | 11/1997 |
| JP | 11 209837 | 8/1999 |
| JP | 11 293372 | 10/1999 |
| JP | 2000 202680 | 7/2000 |
| JP | 2003-293064 | 10/2003 |
| JP | 2004 76057 | 3/2004 |
| JP | 2004-035966 * | 5/2004 |
| JP | 2005-232506 | 9/2005 |
| JP | 2007 39753 | 2/2007 |
| JP | 2007 92101 | 4/2007 |
| JP | 2007 216283 | 8/2007 |

OTHER PUBLICATIONS

U.S. Appl. No. 12/528,807, filed Aug. 27, 2009, Koshigoe, et al.
U.S. Appl. No. 13/037,543, filed Mar. 1, 2011, Ueda, et al.
Extended European Search Report issued on Sep. 23, 2011 in the corresponding European Patent Application No. 07850766.2.

* cited by examiner

*Primary Examiner* — Terressa Boykin

(74) *Attorney, Agent, or Firm* — Oblon, Spivak, McClelland, Maier & Neustadt, L.L.P.

(57) ABSTRACT

Disclosed is an aluminum alloy brazing sheet for heat exchangers, which has high strength after brazing, high corrosion resistance and excellent brazability. Specifically disclosed is an aluminum alloy brazing sheet (1*a*) for heat exchangers comprising a core member (2), a sacrificial member (3) formed on one side of the core member (2), and a brazing filler metal (4) formed on the other side of the core member (2) and composed of an Al—Si alloy. The sacrificial member (3) contains 0.03-0.30% by mass of Fe, 0.01-0.40% by mass of Mn, 0.4-1.4% by mass of Si, 2.0-5.5% by mass of Zn, not more than 0.05% by mass of Mg and the balance of Al and unavoidable impurities. In addition, the sacrificial member (3) has a crystal grain size of 100-400 &mgr;m after 5-minute heat treatment at 600 ˚C during the brazing.

9 Claims, 3 Drawing Sheets

(a)

(b)

ALUMINUM ALLOY BRAZING SHEET FOR HEAT EXCHANGER

FIELD OF THE ART

The present invention relates to an aluminum alloy brazing sheet for heat exchangers, which is to be used for heat exchangers for automobiles or the like.

PRIOR ART

Generally, as a material for tubes in heat exchangers such as radiators, evaporators, and condensers for automobiles is used an aluminum alloy clad material (aluminum alloy brazing sheet).

As such an aluminum alloy clad material (aluminum alloy brazing sheet) have been disclosed a brazing sheet and an aluminum alloy clad material obtained by forming a brazing filler metal of an Al—Si alloy on one face of a core material of aluminum alloy, forming a sacrificial anode material of an Al—Zn alloy on the other face of the core material, and specifying the compositions of these core material, brazing filler metal, and sacrificial anode material to provide improved brazing property, strength, and corrosion resistance (e.g., reference to Patent Document 1).

Patent Document 1: Japanese Laid-Open Patent Publication No. 2004-76057 (paragraphs 0021 to 0040 and 0064)

DISCLOSURE OF THE INVENTION

Problems to be Solved by the Invention

However, with respect to conventional brazing sheets, there are following problems.

In the case of producing tube members or the like in a heat exchanger using the brazing sheet, there occurs parts where the brazing filler metal and the sacrificial anode material are joined. In such parts, since a brazing material of the brazing filler metal is melted to form a fillet due to a heat at the time of brazing, the brazing filler metal and the sacrificial anode material are joined to each other.

However, in the case of a conventional brazing sheet, although the brazing property is improved, a length of the fillet in the joining part may be insufficient, causing an inferior brazing property.

Further, in a heat exchanger for automobiles, it has been tried to make a material thin gauge. In order to make lightweight, compactness, and low cost, it is required to make a material further thin gauge. To promote further thinness, higher strength after brazing and higher corrosion resistance is required and at the same time, good brazing property is demanded.

Herein, in conventional techniques, the levels of the strength after brazing and brazing property has been improved; however in order to satisfy the thin gauge, it is desired to satisfy high strength after brazing and high corrosion resistance and at the same time to further improve brazing property.

Therefore, in view of the above-mentioned state of art, the present invention is completed and the aim of the invention is to provide an aluminum alloy brazing sheet for heat exchangers, which has high strength after brazing, high corrosion resistance, and at the same time, excellent brazing property.

Means for Solving the Problems

As a means for solving the above described problems, the aluminum alloy brazing sheet for heat exchangers of the present invention is characterized by containing a core material, a sacrificial anode material formed in one face side of the core material, and a brazing filler metal made of an Al—Si based alloy formed in the other face side of the core material, wherein the sacrificial anode material contains Fe: 0.03 to 0.30% by mass, Mn: 0.01 to 0.40% by mass, Si: 0.4 to 1.4% by mass, Zn 2.0 to 5.5% by mass, Mg: 0.05% by mass or less, and the balance comprises Al and inevitable impurities and satisfies that the crystal grain size after a heat treatment of 600° C.×5 minutes is 100 to 400 μm.

According to the above-mentioned configuration, since Fe, Mn, Si, Zn, and Mg are added to the sacrificial anode material, an intermetallic compound is produced in the sacrificial anode material and the strength after brazing is improved. Further, since the potential becomes less noble owing to addition of Zn to the sacrificial anode material, the sacrificial anode effect on the core material is heightened and the corrosion resistance is improved. Addition of Si and Mg causes Si and Mg to form solid solution in the alloy structure so that the strength after brazing is improved. Further, since the crystal grain size is controlled in a range of 100 to 400 μm after the heat treatment of 600° C.×5 minutes at the time of brazing, the filler spreading abilities in the joining position of the brazing filler metal and the sacrificial anode material are improved and the length of the fillet becomes long, causing the brazing property to be improved.

Effects of the Invention

According to the aluminum alloy brazing sheet for heat exchangers of the present invention, since a prescribed amount of a prescribed element is added to the sacrificial anode material and the crystal grain size after heat treatment at the time of brazing is controlled to a predetermined range, the strength after brazing and corrosion resistance are improved and at the same time the brazing property is heightened.

BRIEF DESCRIPTION OF THE INVENTION

Figure 3:
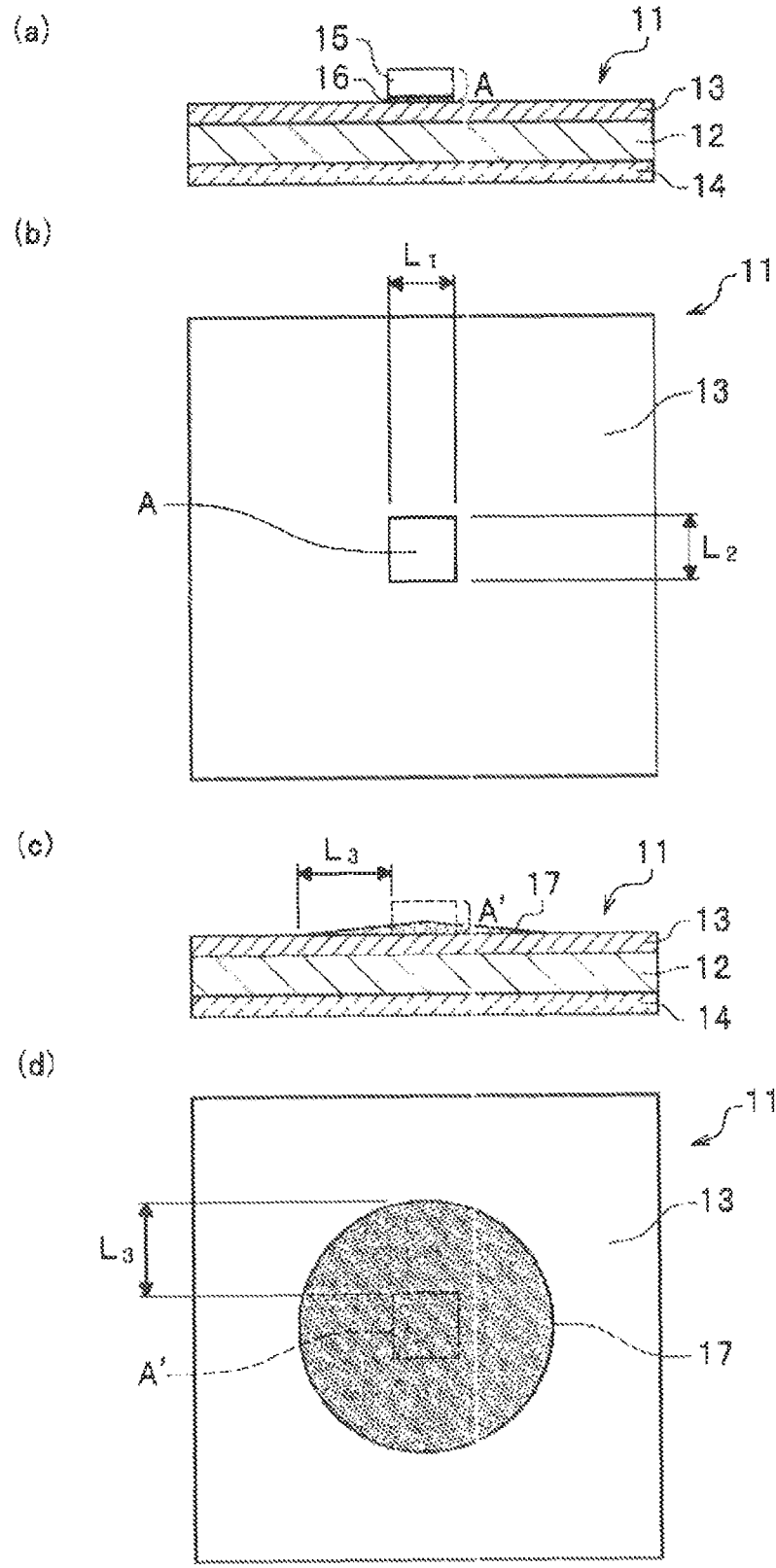

FIG. 3 are schematic views showing an evaluation method of brazing property: FIG. 3A is a schematic view showing the state observed from a transverse direction before brazing heating; FIG. 3B is a schematic view showing the state observed from upper side before brazing heating; FIG. 3C is a schematic view showing the state observed from a transverse direction after brazing heating; and FIG. 3D is a schematic view showing the state observed from upper side after brazing heating.

DESCRIPTION OF SYMBOLS 1a, 1b: Aluminum alloy brazing sheet for heat exchangers
2, 12: Core material
3, 13: Sacrificial anode material
4, 14: Brazing filler metal
5: Intermediate material
S1a: Preparation step of member for core material
S1b: Preparation step of member for sacrificial anode material S1c: Preparation step of member for brazing filler metal
S2: Overlapping step
S3: Heat treatment step
S4: Hot rolling step
S5: Rough annealing step
S6, S8: Cold rolling step
S7: Intermediate annealing step
S9: Final annealing step

BEST MODE FOR CARRYING OUT EMBODIMENTS OF THE INVENTION

Figure 1:
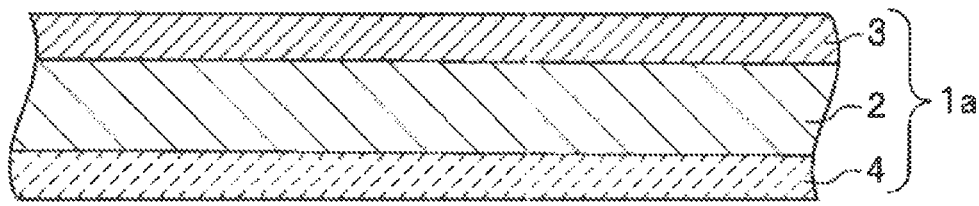
FIG. 1A is a cross-sectional view showing the configuration of an aluminum alloy brazing sheet for heat exchangers of the present invention and FIG. 1B is a cross-sectional view showing the configuration of an aluminum alloy brazing sheet for heat exchangers according to another embodiment.
Figure 1:
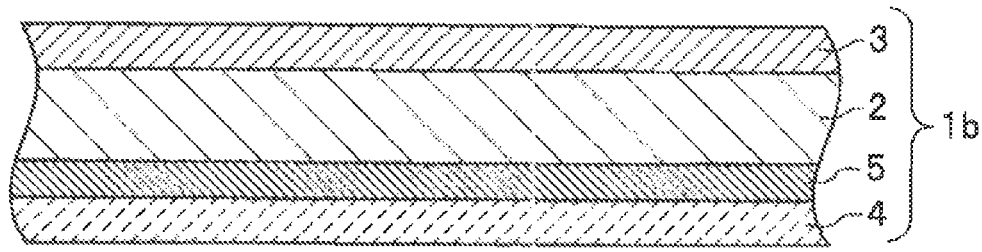
Figure 2:
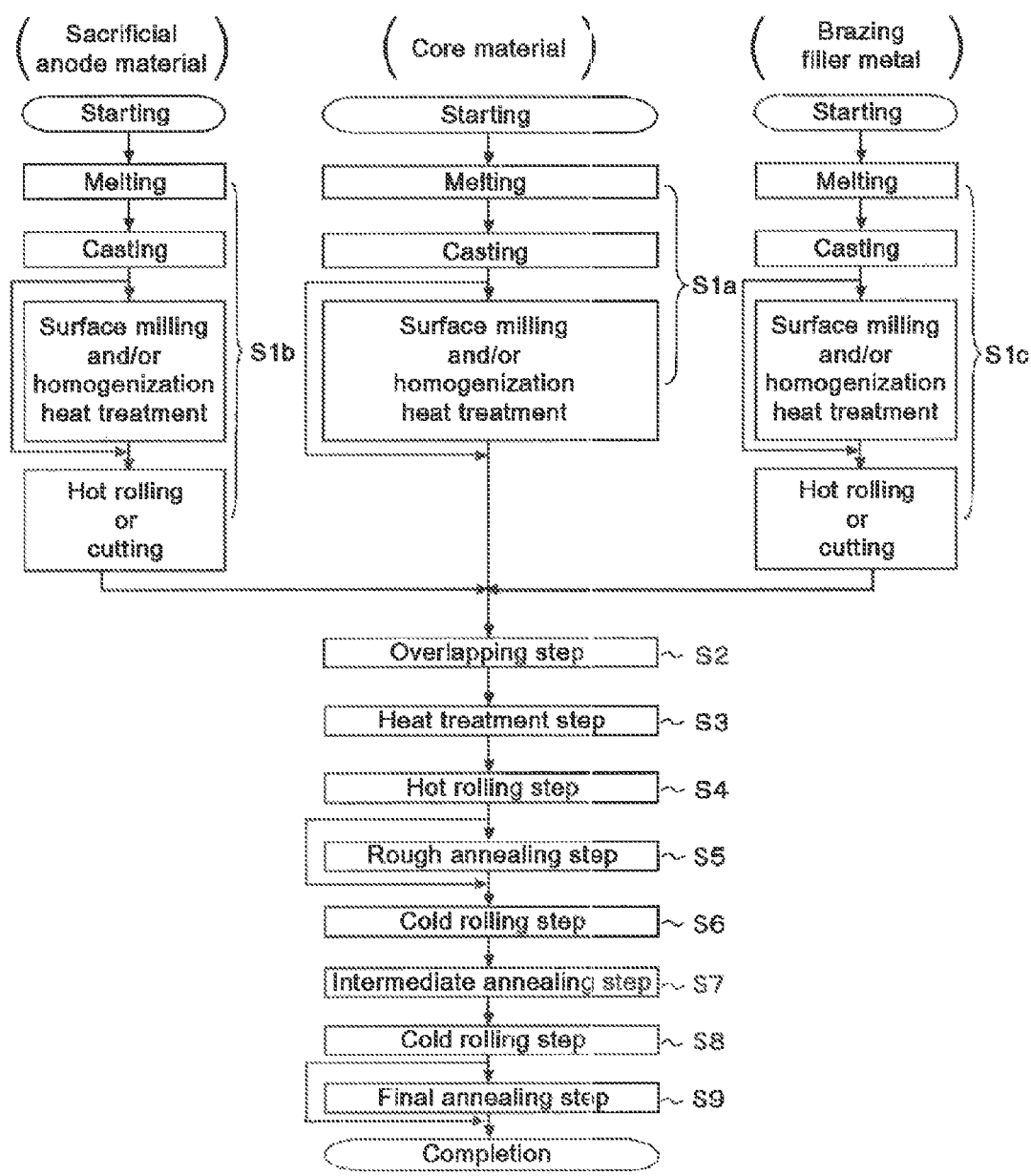
FIG. 2 is a chart showing the flow of a production method of an aluminum alloy brazing sheet for heat exchangers.

Next, an aluminum alloy brazing sheet for heat exchangers of the present invention will be described more in detail with reference to drawings. In drawings for reference, FIG. 1 are cross-sectional views showing the configuration of an aluminum alloy brazing sheet for heat exchangers of the present invention and FIG. 2 is a chart showing the flow of a production method of an aluminum alloy brazing sheet for heat exchangers.

As shown in FIG. 1A, an aluminum alloy brazing sheet for heat exchangers (hereinafter, properly referred to as "brazing sheet") may be a three-layered aluminum alloy brazing sheet for heat exchangers 1a (brazing sheet 1a) obtained by forming a sacrificial anode material 3 in one face side of a core material 2 and a brazing filler metal 4 in the other face side.

Next, reasons for limiting numeral values of the contents of alloying components of the core material 2, the sacrificial anode material 3, and brazing filler metal 4 constituting the blazing sheet 1a and reasons for limiting a crystal grain size of the sacrificial anode material 3 will be described.

<<Core Material>>

As a core material 2 may be a core material 2 containing Cu: 0.5 to 12% by mass, Mn: 0.6 to 1.9% by mass and Si: 0.5 to 1.4% by mass and further containing at least one of Cr: 0.05 to 0.3% by mass and Ti: 0.05 to 0.3, by mass, and including the balance of Al and inevitable impurities. However, the core material 2 is not particularly limited and any alloys which can be used conventionally as the core material 2 may be used. For example, Mg: 0.01 to 0.7% by mass may be contained to improve the strength and additionally Fe may be contained.

<<Sacrificial Anode Material>>

The sacrificial anode material 3 contains Fe: 0.03 to 0.30% by mass, Mn: 0.01 to 0.40% by mass, Si: 0.4 to 1.4% by mass, Zn 2.0 to 5.5% by mass, and Mg: 0.05% by mass or less, and the balance of Al and inevitable impurities and is required to satisfy that the crystal grain size after a heat treatment of 600° C.×5 min is 100 to 400 μm.

Herein, the heat treatment of 600° C.×5 minutes is at the time of brazing.

<Fe: 0.03 to 0.30% by Mass>

Fe forms intermetallic compounds such as Al—Mn—Fe, Al—Fe—Si, and Al—Mn—Fe—Si based compounds in combination with Al, Mn, and Fe and is crystallized or precipitated in the alloy structure to improve the strength after brazing.

If the content of Fe is less than 0.03 by mass, the effect of improving the strength after brazing cannot be caused. On the other hand, if it exceeds 0.30% by mass, the Al—Mn—Fe, Al—Fe—Si, and Al—Mn—Fe—Si based compounds are increased to result in increase of cathode reactivity and deterioration of corrosion resistance.

Accordingly, the content of Fe is defined to be 0.03 to 0.30% by mass.

<Mn: 0.01 to 0.40% by Mass>

Mn forms intermetallic compounds such as Al—Mn—Fe, Al—Mn—Si, and Al—Mn—Fe—Si based compounds in combination with Al, Fe, and Si and is crystallized or precipitated in the alloy structure to improve the strength after brazing.

If the content of Mn is less than 0.01% by mass, the effect of improving the strength after brazing cannot be caused. On the other hand, if it exceeds 0.40% by mass, the flowability of a brazing material on the surface of the sacrificial anode material 3 is lowered to result in deterioration of brazing property (brazing material flowability).

This is because as the liquid-phase brazing material (malting brazing material) contacts and spreads on the surface of the sacrificial anode material 3, Mn in the sacrificial anode material deteriorates the wettability of the liquid-phase brazing material on the surface of the sacrificial anode material 3.

Accordingly, the content of Mn is defined to be 0.01 to 0.40% by mass.

<Si: 0.4 to 1.4% by Mass>

Si forms intermetallic compounds such as Al—Fe—Si, Al—Mn—Si, and Al—Mn—Fe—Si based compounds in combination with Al, Mn, and Fe and is crystallized or precipitated in the alloy structure to improve the strength after brazing. Further, Si partially forms a solid solution in the ally structure to improve the strength after brazing.

If the content of Si is less than 0.4% by mass, due to insufficient solid solution formation, the effect of improving the strength after brazing cannot be caused. On the other hand, if it exceeds 1.4% by mass, Al—Fe—Si, Al—Mn—Si, and Al—Mn—Fe—Si based compounds are increased to result in increase of cathode reactivity and deterioration of corrosion resistance.

Accordingly, the content of Si is defined to be 0.4 to 1.4% by mass.

<Zn: 2.0 to 5.5% by Mass>

Zn is effective to lower the potential of the sacrificial anode material 3 and heightens the sacrificial anodic effect on the core material 2 to improve the corrosion resistance by being added to the sacrificial anode material 3.

If the content of Zn is less than 2.0°, by mass, the effect to lower the potential cannot be caused and the sacrificial anodic effect becomes insufficient to deteriorate the corrosion resistance. On the other hand, if it exceeds 5.5% by mass, the melting point of the sacrificial anode material 3 is lowered and therefore, in a brazing step of brazing the respective components such as tubes, headers, fins, and the like for joining heat exchangers, the sacrificial anode material 3 may be probably partially melted. If the sacrificial anode material 3 is partially melted, the brazing property (brazing flowability), strength after brazing, and corrosion resistance are deteriorated.

Accordingly, the content of Zn is defined to be 2.0 to 5.5% by mass.

<Mg: 0.05% by Mass or Less>

Mg forms a solid solution in the alloy structure to improve the strength after brazing. Further, since Mg forms an intermetallic compound with a composition of $MgZn_2$ with Zn contained in the sacrificial anode material 3, the strength after brazing is further improved.

If the content of Mg exceeds 0.05% by mass, flux and Mg are reacted to form a complex compound such as $MgF_2$. Therefore, the activity of the flux itself is lowered to reduce a function of breaking an oxide coating on the surface of the sacrificial anode material 3, resulting in deterioration of the brazing property.

Accordingly, the content of Mg is defined to be 0.05% by mass or less.

Additionally, in order to obtain the effect of improving the strength after brazing, it is preferable to add Mg in 0.003% by mass or more.

<Balance: Al and Inevitable Impurities>

The components of the sacrificial anode material 3 contains, besides those described above, Al and inevitable impurities as balance. The inevitable impurities may be supposed to include, for example, 0.25% by mass or less of Cu, Ni, Bi, Zr, Sn, P, B, Be and the like. It is allowed to contain them to an extent that the effects of the present invention are not inhibited.

<Crystal Grain Size of Sacrificial Anode Material>

The crystal grain size is defined to be in a range of 100 to 400 μm after a heat treatment of 600° C.×5 minutes at the time of brazing.

By setting a crystal grain size in a structure of the sacrificial anode material 3, in a connection part of the sacrificial anode material 3 and the blazing filler metal 4 at the time of blazing, the brazing spreading property (brazing flowability) of the liquid-phase brazing material along the grain boundaries of the crystal grains is improved and the length of fillet becomes long. Accordingly, the brazing property can be improved.

If the crystal grain size is smaller than 100 μm, the grain boundary density in the surface of the sacrificial anode material 3 becomes so high as to increase the traps in the boundaries of the liquid-phase brazing material and lower the brazing spreading property (brazing flowability). On the other hand, if the crystal grain size exceeds 400 μm, the grain boundary density in the surface of the sacrificial anode material 3 becomes so low as to inhibit the brazing spreading property (brazing flowability). Additionally, being different from the grain insides, the grain boundaries are portions with disordered crystal orientation and therefore, as compared with the grain insides, the liquid-phase brazing material tends to be reacted (dissolved) and spread easily (tends to form spreading paths).

Accordingly, the crystal grain size is defined to be in a range of 100 to 400 μm after a heat treatment of 600° C.×5 min at the time of brazing.

Additionally, the crystal grain size after the heat treatment of 600° C.×5 min at the time of brazing is defined to be preferably in a range of 120 to 380 μm. If the crystal grain size is in a range of 120 to 380 μm, the grain boundary density in the surface of the sacrificial anode material 3 becomes more proper and thus the brazing spreading property (brazing flowability) tends to be easily improved further.

Herein, the crystal grain size in the structure of the sacrificial anode material 3 can be controlled in a range of 100 to 400 μm after a heat treatment of 600° C.×5 minutes at the time of brazing by adjusting conditions of the homogenization a heat treatment of the sacrificial anode material 3 (a cast ingot for the sacrificial anode material) or conditions of the heat treatment for heating carried out after the core material 2 (a member for the core material) and the brazing filler metal 4 (a member for the brazing filler metal) are overlapped and before hot rolling is carried out, and a finish cold rolling ratio in the final cold rolling.

In the case the homogenization heat treatment is carried out, the conditions may be adjusted to be 450 to 610° C., preferably 450 to 560° C.×(1 to 30) hours. In the case where no homogenization heat treatment is carried out, the conditions may be adjusted to be 450 to 560° C.×(1 to 30) hours in the heat treatment for heating carried out before hot rolling. Further, either in the case the homogenization heat treatment is carried out or in the case no homogenization heat treatment is carried out, the finish cold rolling ratio in the final cold rolling is adjusted to be 20 to 40%.

The reason why the range of the crystal grain size is defined to be the range after the heat treatment of 600° C.×5 minutes at the time of brazing is that, as described above, the brazing spreading alters in accordance with the crystal grain size and the brazing spreading is caused due to melting of the brazing material and flowing of the liquid-phase brazing material along the grain boundaries when the temperature reached around 600° C. of the brazing temperature and thus it is sufficient to make the crystal grain size apparent when the temperature reached around 600° C. Further, to say strictly, melting of the brazing material occurs at a temperature around 577 to 600° C., and in this temperature range, the brazing spreading is not so much altered and therefore the range of the crystal grain size is defined as the range after the heat treatment of 600° C.×5 minutes.

The measurement of the crystal grain size can be carried out by a method described in JIS H:0501 7. Cutting Method.

That is, the measurement can be carried out by photographing the surface of the sacrificial anode material 3 by an optical microscope, drawing a straight line in the rolling direction, and counting the number of crystal grains cut by the straight line with a length.

<Thickness of Sacrificial Anode Material>

The thickness of the sacrificial anode material 3 is preferably in a range of 30 to 55 μm.

If the thickness of the sacrificial anode material 3 is thinner than 30 μm, the sacrificial anti-corrosion effect tends to be lowered and the corrosion resistance of the inner face side (cooling water side) tends to be deteriorated. On the other hand, if it exceeds 55 μm, the thickness of the core material 2 becomes thin ad the strength of a brazing sheet 1a tends to be lowered easily.

<<Brazing Filler Metal>>

The brazing filler metal 4 is of an Al—Si based alloy and herein, the Al—Si based alloy may include alloys containing Zn besides Si. That is, examples of the Al—Si based alloy are Al—Si based alloys and Al—Si—Zn based alloys.

As the brazing filler metal 4 is an Al—Si based alloy containing Si: 7 to 12% by mass usable.

If the content of Si is less than 7% by mass, the Al—Si liquid phase amount around the brazing temperature is slight and the brazing property tends to be deteriorated. On the other hand, if it exceeds 12% by mass, since coarse primary crystal Si is increased at the time of casing of the brazing filler metal, excess melting tends to occur easily in the interface of the core material 2/brazing filler metal 4 in the case the brazing sheet 1a is formed and the strength after brazing and corrosion resistance tend to be lowered.

However, the brazing filler metal 4 is not particularly limited and may include any conventionally employed Al—Si based (Al—Si—Zn) alloys. For example, it may contain Fe, Cu, Mn, Mg, and the like besides Si and Zn.

Next, another embodiment of an aluminum alloy brazing sheet for heat exchangers of the present invention will be described.

The aluminum alloy brazing sheet for heat exchangers is sufficient if a sacrificial anode material is formed in the outermost surface in one face side of the core material and a brazing filler metal is formed on the outermost surface in the other face side. It may be an aluminum alloy brazing sheet 1b for heat exchangers (brazing sheet 1b) having 4 layers as shown in FIG. 1B, that is, the sacrificial anode material 3 in one face side of the core material 2, and an intermediate material 5 and the brazing filler metal 4 in the other face side of the core material 2.

Further, although it is not illustrated, a brazing sheet having 5 or more layers by increasing the number of layers of the core material, sacrificial anode material, and intermediate material may also be usable.

<<Intermediate Material>>

The intermediate material 5 may be inserted between the core material 2 and the brazing filler metal 4 as a Mg diffusion prevention layer for preventing diffusion of Mg to the brazing filler metal 4 in the case where Mg is added to the core material 2 and also as a sacrificial anti-corrosive layer for improving corrosion resistance of the side of the brazing filler metal 4.

The intermediate material 5 is of an Al—Mn based alloy and, herein, the Al—Mn based alloy may include alloys containing Cu, Si, and the like besides Mn.

As the intermediate material 5, for example, an Al—Mn—Cu—Si based alloy can be used. However, the intermediate material 5 is not particularly limited and those which are used conventionally as the intermediate material 5 can be used. For example, Ti may be added beside Mn, Cu, and Si.

Next, with reference to FIG. 2, one example of a production method (production process) of the aluminum alloy brazing sheet for heat exchangers will be described.

At first, an ingot for a core material (member for a core material), an ingot for a sacrificial anode material, and an ingot for a brazing filler metal are obtained by melting and casing an aluminum alloy for a core material, an aluminum alloy for a sacrificial anode material, and an aluminum alloy for a brazing filler metal and if necessary, carrying out surface-milling and homogenization heating. Herein, with respect to the ingot for a sacrificial anode material, in the case the homogenization heating is carried out, to control the crystal grain size after the heat treatment of 600° C.×5 minutes at the time of brazing to be 100 to 400 μm, the condition is controlled to be 450 to 610° C. (preferably 450 to 560° C.)×(1 to 30) hours. Further, with reference to the ingot for a sacrificial anode material and the ingot for a brazing filler metal, these ingots are hot-rolled or cut to respectively prescribed thicknesses to obtain a member for a sacrificial anode material and a member for a brazing filler metal (preparation step of a member for a core material: S1a, preparation step of a member for sacrificial anode material S1b: and preparation step of a member for a brazing filler metal S1c).

Although it is not illustrated, in the case an intermediate material is to be formed, a member for an intermediate material can be produced in the same manner as those described above for the member for a sacrificial anode material and the member for a brazing filler metal.

Next, the member for a core material, the member for a sacrificial anode material, and the member for a brazing filler metal (based on the necessity, the member for an intermediate material) are overlapped to an extent of giving a prescribed clad ratio in an overlapping step (S2). Thereafter, a heat treatment is carried out at a temperature of 400° C. or higher in a heat treatment step (S3). Roll bonding is carried out in a hot rolling step (S4) to obtain a plate material. In the heating of the heat treatment step (S3), if no homogenization heat treatment is carried out for the ingot for a sacrificial anode material, to control the crystal grain size to be 100 to 400 μm after the heat treatment of 600° C.×5 minutes at the time of brazing, the condition is adjusted to be 450 to 560° C.×(1 to 30) hours.

Thereafter, a rough annealing step (S5), a cold rolling step (S6), an intermediate annealing step (S7), and a cold rolling step (S8) are carried out to give a prescribed thickness.

The rough annealing step (S5) may be carried out in the case element diffusion is promoted. Further, the condition of the intermediate annealing in the intermediate annealing step (S7) is preferably at 350 to 450° C. for 3 hours or longer. The cold rolling ratio (finish cold rolling reduction) in the final cold rolling step (S8) is adjusted to be 20 to 40% in order to control the crystal grain size to be 100 to 400 μm after the heat treatment of 600° C.×5 min at the time of brazing. Further, after the thickness is adjusted to be the final thickness, in consideration of the moldability, final annealing may be carried out in the final annealing step (S9). If the final annealing is carried out, the material is softened and the elongation is improved and the formability is reliably retained.

EXAMPLES

Next, aluminum alloys brazing sheet for heat exchangers of the present invention will be described practically by comparing Examples satisfying the requirements of the invention with Comparative Examples, which fail to satisfy the requirements of the invention.

<<Production of Test Materials>>

At first, an aluminum alloy for a core material, an aluminum alloy for a sacrificial anode material, and an aluminum alloy for a brazing filler metal were melted and casted by continuous casting. With respect to an aluminum alloy for a core material (a member for a core material), a homogenization heat treatment of 550° C.×10 hours was carried out to obtain an ingot for a core material (a member for a core material) with a prescribed thickness. With respect to an aluminum alloy for a sacrificial anode material (a member for a sacrificial anode material) and an aluminum alloy for a brazing filler metal (a member for a brazing filler metal), the homogenization heat treatment of 550° C.×10 hours and the homogenization heat treatment of 500° C.×10 hours were carried out, respectively, to obtain an ingot for a sacrificial anode material and an ingot for a brazing filler metal. The ingot for a sacrificial anode material and the ingot for a brazing filler metal were hot-rolled to the respective thicknesses to obtain a member for a sacrificial anode material and a member for a brazing filler metal. Thereafter, the member for a core material, the member for a sacrificial anode material and the member for a brazing filler metal were combined as shown in Table 2 and overlaid to give prescribed clad ratio and heated at a temperature of 450° C. an thereafter roll-bonded by hot rolling to obtain a plate material. Thereafter, the plate was cold-rolled and annealed by intermediate annealing of 360° C.×3 hours and further cold-rolled at 20 to 40% cold-rolling reduction to produce an aluminum alloy brazing sheet with a thickness of 0.20 mm (a test material).

Table 1 shows components of the brazing filler metal and the sacrificial anode materials. In Table 1, "-" shows no addition of the components and the numeral values with an underline shows numerals out of the scope of the present invention. Further, the composition of the core material was an alloy containing Si: 0.80% by mass, Fe: 0.20% by mass, Cu: 0.98% by mass, Mn: 1.4% by mass, Mg: 0.01% by mass, Ti: 0.12% by mass, and the balance of Al and inevitable impurities.

TABLE 1

| | Symbols | Components (% by mass) | | | | | | Remarks |
| | | Si | Fe | Cu | Mn | Mg | Zn | |
| --- | --- | --- | --- | --- | --- | --- | --- | --- |
| Brazing filler metal | F1 | 10 | 0.18 | 0.03 | 0.01 | 0.02 | | |

TABLE 1-continued

|  | Symbols | Components (% by mass) | | | | | | Remarks | |
|---|---|---|---|---|---|---|---|---|---|
|  |  | Si | Fe | Cu | Mn | Mg | Zn |  |  |
| Sacrificial anode materials | S1 | 0.45 | 0.13 | — | 0.02 | 0.02 | 4.9 |  | Examples |
|  | S2 | 0.58 | 0.14 | — | 0.24 | 0.03 | 5.2 |  |  |
|  | S3 | 0.72 | 0.21 | — | 0.31 | 0.04 | 3.6 |  |  |
|  | S4 | 1.15 | 0.17 | — | 0.29 | 0.01 | 4.2 |  |  |
|  | S5 | 0.61 | 0.2 | — | 0.18 | 0.003 | 4.8 |  |  |
|  | S6 | 0.82 | 0.15 | — | 0.07 | 0.004 | 4.4 |  |  |
|  | S7 | 0.7 | 0.21 | — | 0.2 | 0.04 | 4.3 |  |  |
|  | S8 | 0.6 | 0.11 | — | 0.09 | 0.01 | 3.3 |  |  |
|  | S9 | 0.72 | 0.02 | — | 0.12 | 0.02 | 3.5 | Fe less than the lower limit value | Comparative Examples |
|  | S10 | 0.74 | 0.4 | — | 0.19 | 0.03 | 3.8 | Fe exceeding the upper limit value |  |
|  | S11 | 0.68 | 0.17 | — | 0.005 | 0.03 | 4.2 | Mn less than the lower limit value |  |
|  | S12 | 0.77 | 0.25 | — | 0.44 | 0.03 | 4.7 | Mn exceeding the upper limit value |  |
|  | S13 | 0.29 | 0.11 | — | 0.32 | 0.03 | 5.2 | Si less than the lower limit value |  |
|  | S14 | 1.6 | 0.18 | — | 0.27 | 0.02 | 4.8 | Si exceeding the upper limit value |  |
|  | S15 | 0.82 | 0.22 | — | 0.24 | 0.02 | 1.7 | Zn less than the lower limit value |  |
|  | S16 | 0.8 | 0.21 | — | 0.16 | 0.02 | 6.2 | Zn exceeding the upper limit value |  |
|  | S17 | 0.79 | 0.22 | — | 0.22 | 0.06 | 5.4 | Mg exceeding the upper limit value |  |
|  | S18 | 0.59 | 0.17 | — | 0.06 | 0.03 | 4.9 | Crystal grain size smaller than 100 μm |  |
|  | S19 | 0.61 | 0.15 | — | 0.19 | 0.04 | 3.8 | Crystal grain size exceeding 400 μm |  |

*Balance: Al and inevitable impurities

Properties of each aluminum alloy brazing sheet (each test material) for heat exchangers produced in the above-mentioned manner were evaluated by the following respective tests.

<<Testing Methods>>

<Brazing Property (Brazing Flowability)>

The method for testing brazing property (brazing flowability) will be described with reference to drawings. In the drawings to be referred to, FIG. 3 are schematic views showing an evaluation method of brazing property: FIG. 3A is a schematic view showing the state observed from a transverse direction before brazing heating: FIG. 3B is a schematic view method state observed from upper side before brazing heating: FIG. 3C is a schematic view showing the state observed from a transverse direction after brazing heating: and FIG. 3D is a schematic view showing the state observed from upper side after brazing heating.

As shown in FIGS. 3A and 3B, a preplaced brazing filler metal A (0.25 mm (thickness)×5 mm ($L_1$)×5 mm ($L_2$)) obtained by coating one face of a brazing filler metal 15 with 10 g/m² of flux 16 and containing Si: 10% by weight and balance of Al and inevitable impurities was put on the surface of a sacrificial anode material 13 of a test material 11 made of a core material 12, the sacrificial anode material 13, and a brazing filler metal 14 and brazed by a heat treatment of 600° C.×5 minutes. Accordingly, as shown in FIGS. 3C and 3D, the preplaced brazing filler metal 17 of the replaced brazing filler metal 17 was spread and the brazing spreading distance $L_3$ was measured. Herein, the brazing spreading distance $L_3$ was defined to be the distance from the end part of the original preplaced brazing filler metal A' before the heating to the tip end of the brazing spreading.

Those with the brazing spreading distance $L_3$ of 5 mm or longer were defined to be good (marked ○) in the brazing property (brazing flowability) and those shorter than 5 mm were defined to be inferior (marked x).

<Strength after Brazing>

With respect to the test of strength after brazing, a JIS No. 5 test piece was produced in parallel to the rolling direction from each test material after a heat treatment of 600° C.×5 min and a tensile test was carried out at room temperature to measure the tensile strength. Those with tensile strength of 160 MPa were defined to be good (marked ○) in the strength after brazing and those less than 160 MPa were defined to be inferior (marked x).

<Corrosion Resistance>

As a test for corrosion resistance, corrosion resistance in the sacrificial anode material side was evaluated. Practically, an immersion test was carried out by repeating cycles for 30 days, each of which involved immersion in a solution containing $Cl^-$ 300 ppm, $SO_4^{2-}$ 100 ppm, and $Cu^{2+}$ 5 ppm, cooling by spontaneous cooling to room temperature after 88° C.×8 hours, and keeping the state for 16 hours and the corrosion depth was measured. Those having the corrosion depth of the sacrificial anode material thickness or less were defined to be excellent (marked ⊙), those having the corrosion depth of the sacrificial anode material thickness+less than 20 μm were defined to be good (marked ○), and those having the corrosion depth of the sacrificial anode material thickness+not less than 20 μm were defined to be inferior (marked x).

The results of these tests are shown in Table 2. The crystal grain size of each sacrificial anode material was measured according to a method described in JIS H: 0501 7. Cutting Method.

TABLE 2

|  | Test material No. | Brazing filler metal* | Sacrificial anode material | Thickness (mm) | Sacrificial anode material thickness (μm) | Crystal grain size of sacrificial anode material (μm) | Brazing property (brazing flowability) | Strength after brazing | Corrosion resistance | Others |
|---|---|---|---|---|---|---|---|---|---|---|
| Examples | 1 | F1 | S1 | 0.2 | 40 | 122 | ○ | ○ | ⊙ | |
|  | 2 | F1 | S2 | 0.2 | 35 | 203 | ○ | ○ | ⊙ | |
|  | 3 | F1 | S3 | 0.2 | 45 | 237 | ○ | ○ | ⊙ | |
|  | 4 | F1 | S4 | 0.2 | 40 | 204 | ○ | ○ | ⊙ | |
|  | 5 | F1 | S5 | 0.2 | 40 | 178 | ○ | ○ | ⊙ | |
|  | 6 | F1 | S6 | 0.2 | 40 | 153 | ○ | ○ | ⊙ | |
|  | 7 | F1 | S7 | 0.2 | 40 | 190 | ○ | ○ | ⊙ | |
|  | 8 | F1 | S8 | 0.2 | 40 | 140 | ○ | ○ | ○ | |
| Comparative Examples | 9 | F1 | S9 | 0.2 | 45 | 251 | ○ | X | ⊙ | |
|  | 10 | F1 | S10 | 0.2 | 45 | 177 | ○ | ○ | X | |
|  | 11 | F1 | S11 | 0.2 | 40 | 137 | ○ | X | ⊙ | |
|  | 12 | F1 | S12 | 0.2 | 40 | 207 | X | ○ | ⊙ | |
|  | 13 | F1 | S13 | 0.2 | 35 | 181 | ○ | X | ⊙ | |
|  | 14 | F1 | S14 | 0.2 | 40 | 163 | ○ | ○ | X | |
|  | 15 | F1 | S15 | 0.2 | 40 | 256 | ○ | ○ | X | |
|  | 16 | F1 | S16 | 0.2 | 40 | 186 | X | X | X | Partially melted |
|  | 17 | F1 | S17 | 0.2 | 35 | 247 | X | ○ | ⊙ | |
|  | 18 | F1 | S18 | 0.2 | 40 | 89 | X | ○ | ⊙ | |

*Thickness of the brazing filler metal was 40 μm.

As shown in Table 2, since the test materials No. 1 to 8 all satisfied the requirements of the present invention, the brazing property (brazing flowability), strength after brazing, and corrosion resistance were all excellent or good.

On the other hand, No. 9 had the Fe concentration of the sacrificial anode material (S9) less than the lower limit value and therefore, the strength after brazing was inferior. No. 10 had the Fe concentration of the sacrificial anode material (S10) exceeding the upper limit, and therefore the Al—Mn—Fe, Al—Fe—Si, and Al—Mn—Fe—Si based compounds were increased to result in increase of cathode reactivity and inferiority of the corrosion resistance. No. 11 had the Mn concentration of the sacrificial anode material (S11) less than the lower limit value and therefore, the strength after brazing was inferior. No. 12 had the Mn concentration of the sacrificial anode material (S12) exceeding the upper limit, and therefore the brazing property (brazing flowability) was inferior.

No. 13 had the Si concentration of the sacrificial anode material (S13) less than the lower limit value and therefore, the strength after brazing was inferior. No. 14 had the Si concentration of the sacrificial anode material (S14) exceeding the upper limit, and therefore the Al—Fe—Si, Al—Mn—Si, and Al—Mn—Fe—Si based compounds were increased to result in increase of cathode reactivity and inferiority of the corrosion resistance. No. 15 had the Zn concentration of the sacrificial anode material (S15) less than the lower limit value and therefore, the effect of lowering the potential could not be caused and thus the corrosion resistance was inferior. No. 16 had the Zn concentration of the sacrificial anode material (S16) exceeding the upper limit, and therefore the melting point of the sacrificial anode material was decreased and the sacrificial anode material was partially melted and the brazing property (brazing flowability), the strength after brazing, and the corrosion resistance were all inferior.

No. 17 had the Mg concentration of the sacrificial anode material (S17) exceeding the upper limit, and therefore the activity of the flux itself was decreased and the function of breaking an oxide coating on the surface of the sacrificial anode material 3 was lowered and the brazing property (brazing flowability) was inferior. No. 18 had the primary grain size of the sacrificial anode material (S18) smaller than the lower limit, and therefore the grain boundary density of the surface of the sacrificial anode material was increased too much and the traps of the liquid-phase brazing material in the grain boundaries were increased and the brazing property (brazing flowability) was inferior. No. 19 had the primary grain size of the sacrificial anode material (S19) exceeding the upper limit, and therefore the grain boundary density of the surface of the sacrificial anode material was decreased so much as to inhibit the brazing spreading property of spreading the liquid-phase brazing material along the grain boundaries and the brazing property (brazing flowability) was inferior.

The present invention was described along with preferable embodiments and Examples; however the present invention should not be limited to these embodiments and Examples. Various modifications and substitutions to specific process conditions and structures can be made without departing from the spirit and scope of the present invention. Accordingly, the invention is not to be considered as being limited by the foregoing descriptions, but is only limited by the scope of the appended claims.

The invention claimed is:

1. An aluminum alloy brazing sheet, comprising a core material, a sacrificial anode material formed in one face side of the core material, and a brazing filler metal made of an Al-Si based alloy formed in the other face side of the core material, wherein the sacrificial anode material has a composition comprising Fe: 0.03 to 0.30% by mass, Mn: 0.01 to 0.40% by mass, Si: larger than 0.4 and 1.4% or less by mass, Zn 2.0 to 5.5% by mass, Mg: 0.05% by mass or less, and Al and inevitable impurities and wherein the sacrificial anode material after a heat treatment of 600° C.×5 minutes has a crystal grain size in a range of from 100 to 400 μm.

2. The aluminum alloy brazing sheet according to claim 1, wherein the crystal grain size is in a range of from 120 to 380 μm.

3. The aluminum alloy brazing sheet according to claim 1, wherein a thickness of the sacrificial anode material is in a range of from 30 to 55 μm.

4. The aluminum alloy brazing sheet according to claim 1, wherein the brazing filler metal has a composition comprising Si in a range of from 7 to 12% by mass.

5. The aluminum alloy brazing sheet according to claim 1, wherein the aluminum alloy brazing sheet further comprises an intermediate material.

6. The aluminum alloy brazing sheet according to claim 5, wherein the intermediate material is placed between the core material and the brazing filler metal.

7. The aluminum alloy brazing sheet according to claim 1, wherein the composition of the sacrificial anode material comprises Si in a range of from 0.45 to 1.4% by mass.

8. The aluminum alloy brazing sheet according to claim 1, wherein the core material has a composition comprising Cu in a range of from 0.5 to 12% by mass, Mn in a range of from 0.6 to 1.9% by mass, Si in a range of from 0.5 to 1.4%, at least one of Cr and Ti in a range of from 0.05 to 0.3% by mass, Al and inevitable impurities.

9. The aluminum alloy brazing sheet according to claim 1, wherein the composition of the sacrificial anode material consists of Fe: 0.03 to 0.30% by mass, Mn: 0.01 to 0.40% by mass, Si: larger than 0.4 and 1.4% or less by mass, Zn 2.0 to 5.5% by mass, Mg: 0. 05% by mass or less, and Al and inevitable impurities.

* * * * *